United States Patent [19]

Perna

[11] 4,326,107
[45] Apr. 20, 1982

[54] COMMUNICATION SYSTEM AND MEANS FOR INTERCONNECTION OF SAME

[75] Inventor: Jiulio Perna, Naperville, Ill.

[73] Assignee: Bunker Ramo Corporation, Oak Brook, Ill.

[21] Appl. No.: 92,865

[22] Filed: Nov. 9, 1979

Related U.S. Application Data

[63] Continuation-in-part of Ser. No. 78,351, Sep. 24, 1979.

[51] Int. Cl.³ .............................................. H04Q 1/16
[52] U.S. Cl. ................................... 179/98; 179/1 PC
[58] Field of Search .................... 179/98, 99 R, 1 PC, 179/91 R

[56] References Cited

U.S. PATENT DOCUMENTS

| | | | |
|---|---|---|---|
| 3,573,373 | 4/1971 | Mullin | 179/98 |
| 3,869,592 | 3/1975 | Humphrey et al. | 179/98 |
| 3,990,763 | 11/1976 | Kress | 179/1 PC |
| 4,018,997 | 4/1977 | Hoover et al. | 179/98 |
| 4,096,359 | 6/1978 | Barsellotti | 179/98 |
| 4,140,885 | 2/1979 | Verhagen | 179/98 |

*Primary Examiner*—Gerald L. Brigance
*Attorney, Agent, or Firm*—N. A. Camasto; J. R. Hoffman

[57] ABSTRACT

A novel communication system and means for interconnecting communication trunk lines to multiple communication terminals is disclosed. The interconnection apparatus includes multi-circuit connectors coupled to the trunk lines and connector members coupled to information transmission cables routed from the various terminal stations within the communication network. Means are provided for interconnecting the multi-circuit connectors or trunk lines to the connector members so that any one of the communication channels may be associated with any one of the stations simply by mating one of a plurality of relocatable connectors to any of the various connector members. The components of the interconnection apparatus are characterized by a modular construction and adaptable to factory assembly to thereby provide versatility and reliability beyond that obtained with prior art systems.

22 Claims, 9 Drawing Figures

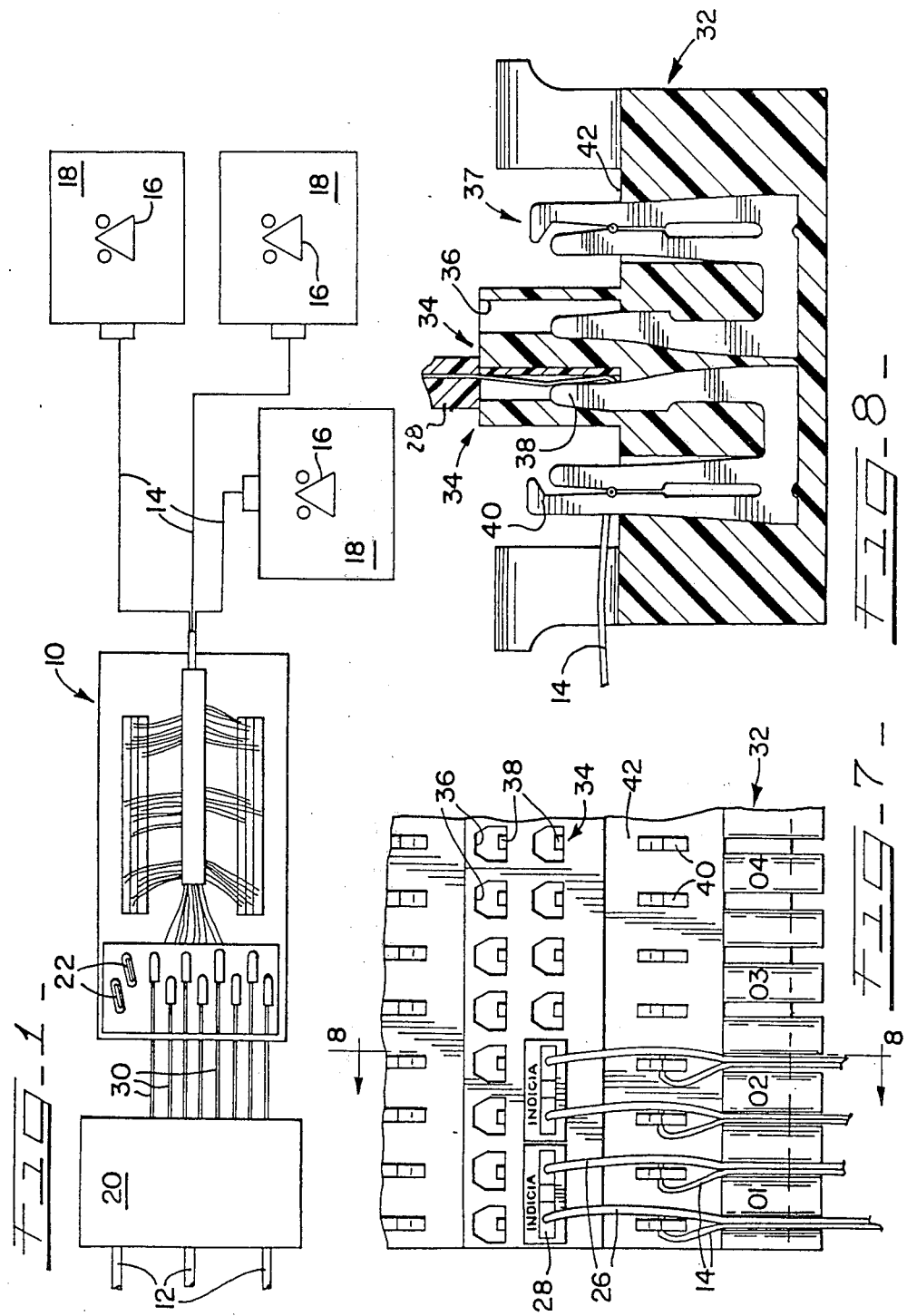

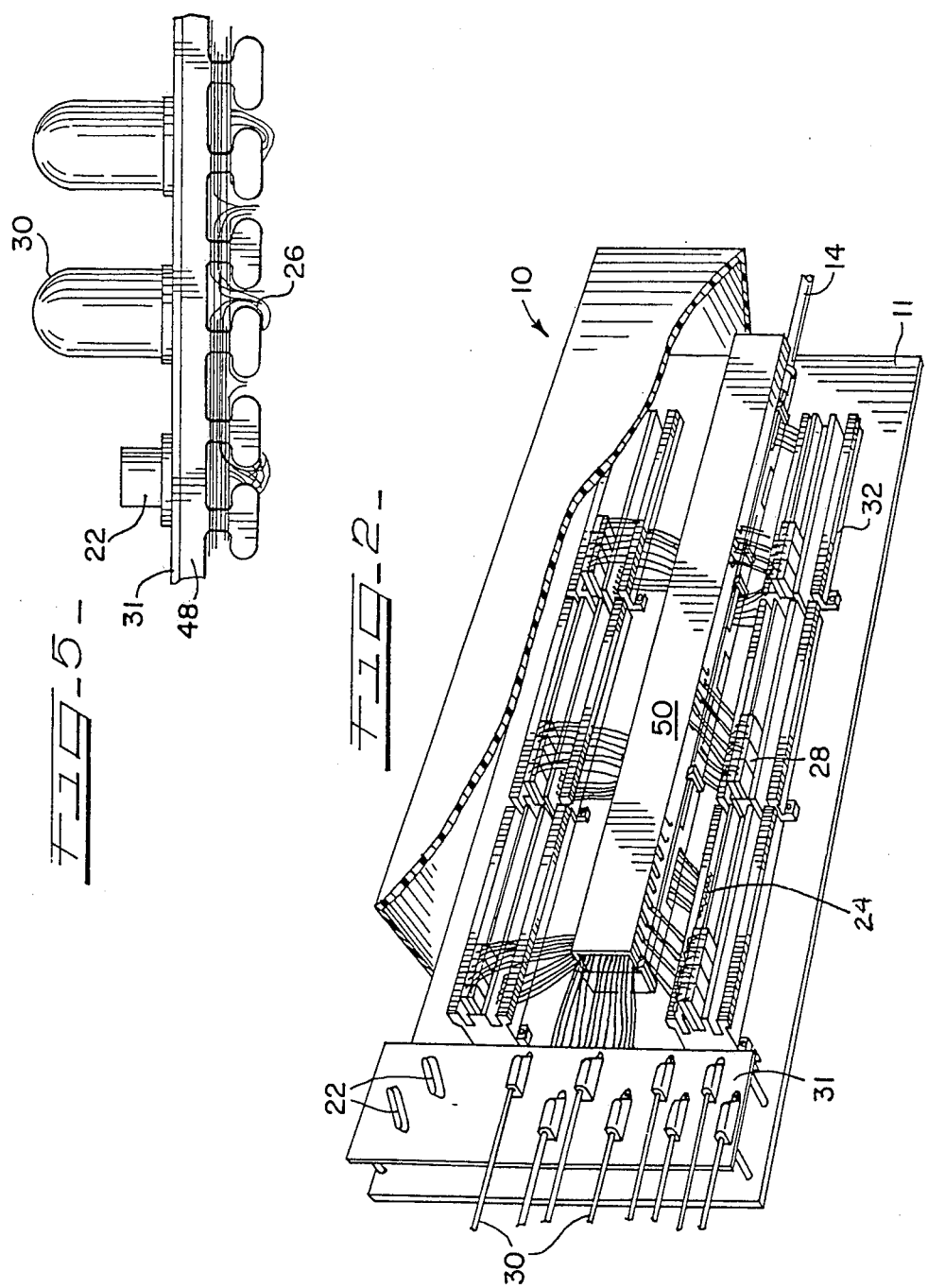

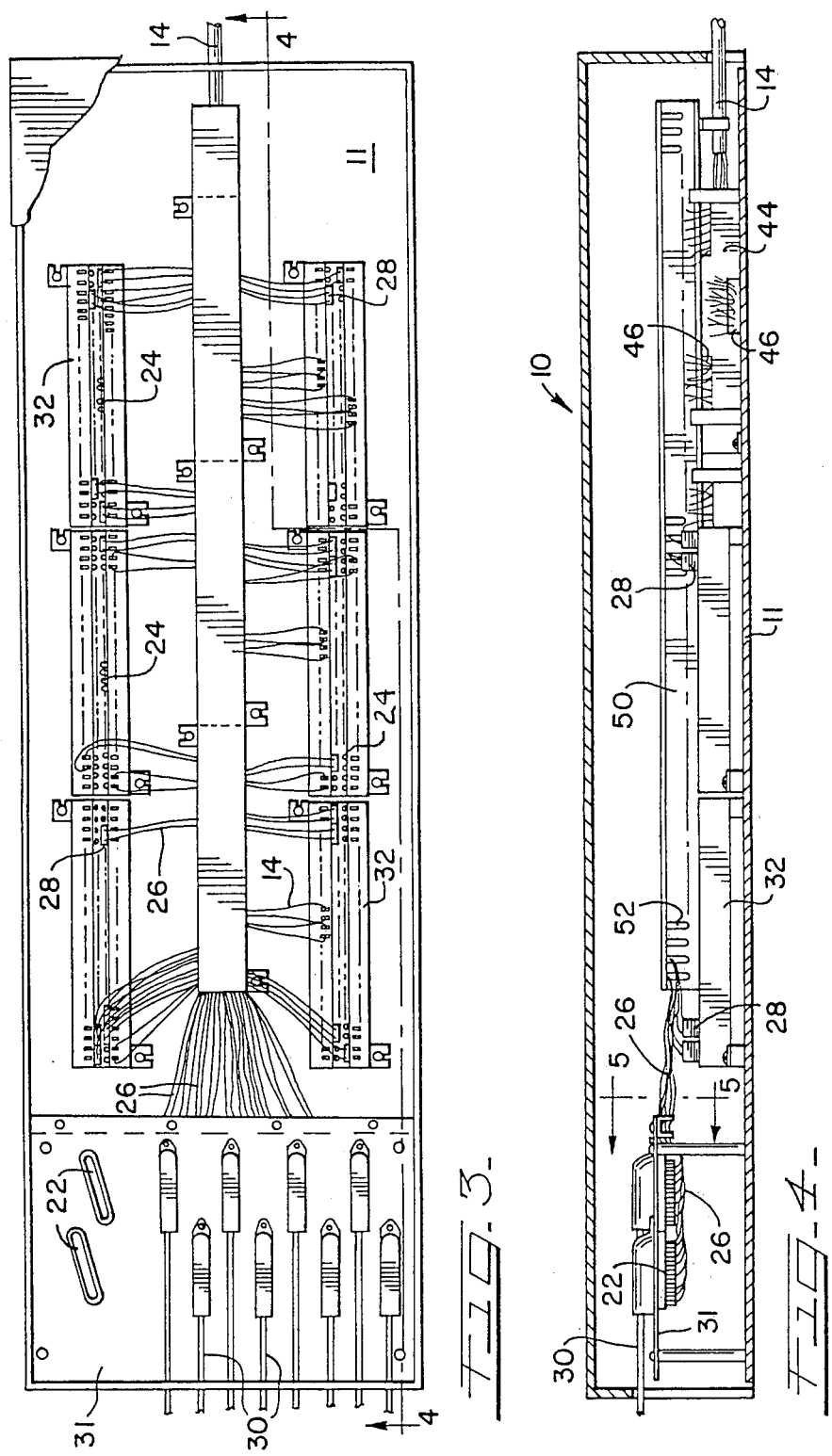

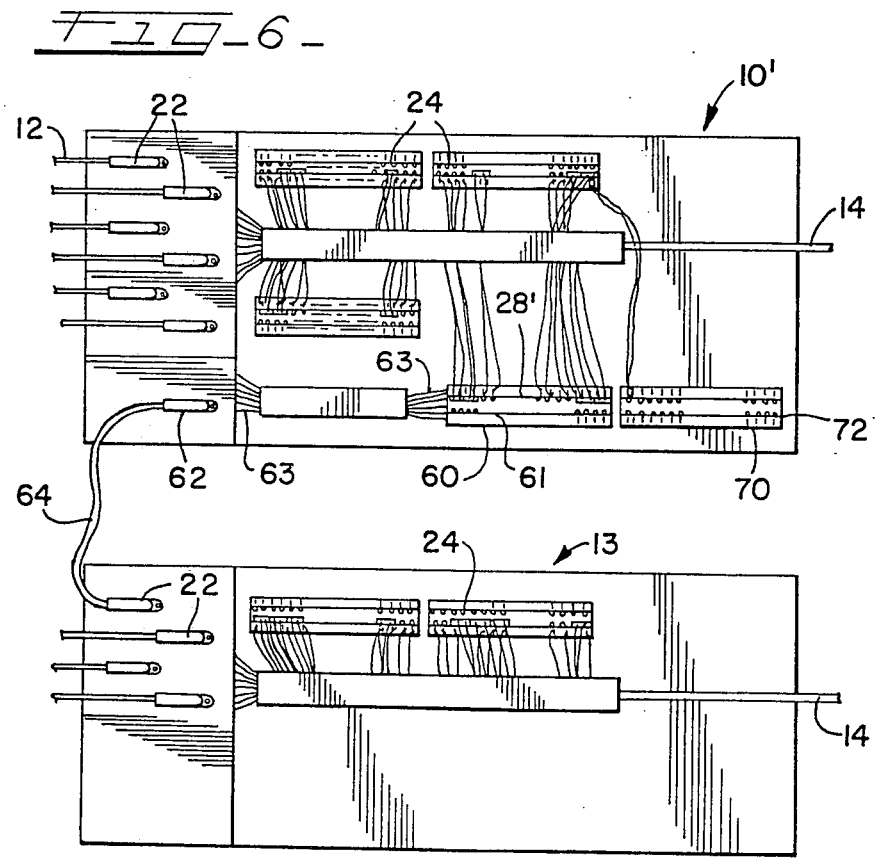

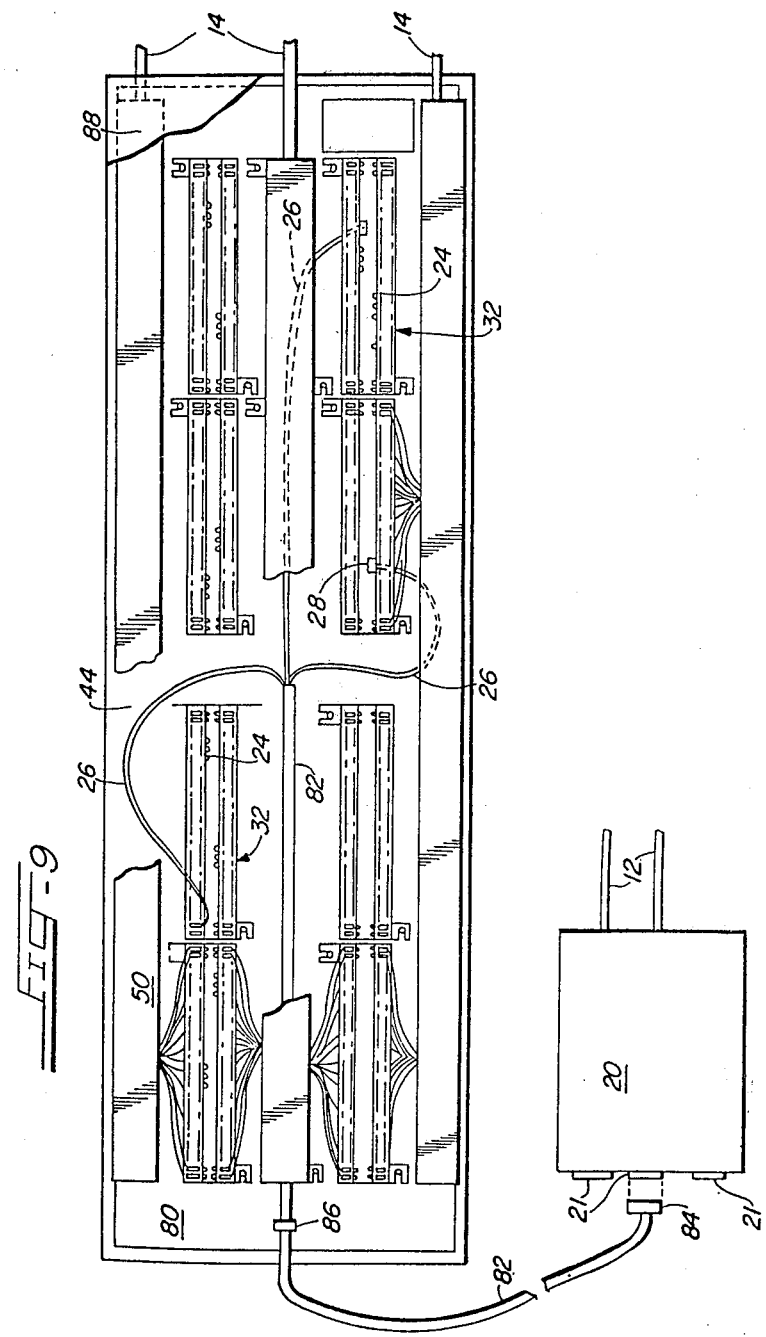

COMMUNICATION SYSTEM AND MEANS FOR INTERCONNECTION OF SAME

This is a continuation-in-part of U.S. application Ser. No. 078,351, filed Sept. 24, 1979.

BACKGROUND OF THE INVENTION

The present invention is directed generally to a manually programmable multi-channel communication network capable of linking a plurality of different information terminal locations within an office building or the like. More particularly, the invention relates to a mechanically programmable interconnection or "cross-connect" system for a telephone installation providing service to a multiple telephone service area. The invention is most advantageously employed in an intrabuilding environment where a large number of individual telephone instruments or handsets are located throughout a given service area.

In recent years, the telephone industry has made great strides in reducing the costs of telephone equipment and the expenses attendant to its installation and maintenance. An area of particular concern has been the need to reduce the labor costs in initially arranging or "programming" and thereafter rearranging or "reprogramming" the numerous telephone numbers to different locations within a given service area. Accordingly, modularized systems have been developed which reduce field wiring and simplify the procedures employed in installing or reprogramming the telephone system. One example of a prior art system intended to address these problems is that disclosed in U.S. Pat. No. 3,869,582 owned by Allstate Insurance Company. The telephone system described in the Allstate patent generally includes a central distribution panel and one or more remote or "satellite" distribution panels which are permanently wired to the central distribution panel. Patchcords are used with both the central and satellite panels to enable physical rearrangement or relocation of the telephone numbers to different parts of the service area. The Allstate system, however, is still relatively expensive, requiring multiple distribution panels, and often requires rearrangement of patchcords at more than one location, which complicates the reprogramming procedure and increases the attendant reconnection costs, as well.

Another prior art system is disclosed in U.S. patent application Ser. No. 058,885 filed on July 19, 1979 in the name of Arie Verhagen and assigned to Bunker Ramo Corporation, the assignee of this application. The Verhagen application discloses an interconnection or cross-connect approach wherein the incoming telephone lines are hard-wired or otherwise affixed to individual receptacle members and the station cables are field terminated to individual plug connectors. The Verhagen system represents a significant advance over the Allstate approach, since it is extremely low cost, it saves space and only a single junction is required which can be serviced by relatively unskilled personnel. Nevertheless, it suffers from the disadvantage that each of the station cables must be terminated in the field to a connector which may be subjected to many mating cycles during its useful life. Such field terminable connectors are inherently less reliable than factory assembled terminations and their use increases the costs of initial installation.

Other electronic systems have been developed for electronic reprogramming of telephone systems but these require specific equipment to electronically "enter" the system as well as a trained operator skilled in working with computer software.

SUMMARY OF THE INVENTION

The present invention is directed to a novel interconnection system used to provide service to a multichannel telephone, data processing or other communication installation. Because of its unique assemblage of components, the system is extremely low cost, occupies very little space and is mechanically programmable and reprogrammable by a simple manual technique easily completed on-site by relatively unskilled personnel. In addition, the communication channels may be relocated throughout the entire service area from a single location. The modular design of the present invention also permits its expeditious adaptation to communication or telephonic installation of different sizes.

Generally, the interconnection or cross-connect system of the present invention includes one or more multi-circuit connectors, a plurality of connector members and means for interconnecting them. The multi-circuit connectors are adapted to receive and couple with the communication trunk lines, whereas the connector members terminate the individual information transmission cables associated with the various discrete physical locations or "stations" throughout the service area. The interconnecting means includes a plurality of conductor means, each hard-wired or otherwise permanently affixed at one end to a multi-circuit connectors and at its other end to a relocatable connector. Each connector member is identifiable with a given station, and each relocatable connector is identifiable with a given communication channel or channel identifier, i.e., a telephone number, and is directly matable with any of the connector members. Accordingly, the communication network is programmed or reprogrammed simply by mating the "channel identified" relocatable connectors with the "station identified" connector members.

An important aspect of the invention is the recognition that factory assembled or "prewired" components provide a greater measure of ruggedness and reliability with the additional advantage of reducing field installation costs. Accordingly, the unique arrangement of components used in the present invention allows for the factory assembly of the interconnecting means, itself, and the prewiring of the interconnecting means to the individual multi-circuit connectors when desired.

Another important aspect of the invention is the recognition that the terminus of the telephone or other communication trunk lines will ordinarily be physically proximate to the location of the cross-connect system. Accordingly, the interconnecting means can be prefabricated at the factory as an integral cable assembly, having individual conductor means terminated to relocatable connectors and extending from a cable of a predetermined and relatively short length.

Another aspect of the invention is the provision of modularized components which facilitates adaption of the cross-connect system to different sized communication networks, reduces space requirements and minimizes installation costs. For example, in accord with the present invention the multi-circuit connectors or connector members may be mounted on one or more submodules which, in turn, may be assembled to a main termination module. The integrated assembly permits installation of the cross-connect system simply by terminating the telephone trunk lines and information transmission cables to the multi-circuit connectors and connector members, respectively, and thereafter mating the various relocatable connectors with the connector members. The use of modularized components and prefabricated cable assemblies also permits the adaptation of the cross-connect system to a kit form for convenient and low cost shipment and expedient assembly in the field.

A still further aspect of the invention is the provision of an interconnection system which facilitates and simplifies the reprogramming of the communication network.

A further aspect of the invention is the provision of a manually programmable telephone or other communication installation having a connectorized and modularized cross-connect system located at a single locus within the service area, the individual components of the system being ruggedly constructed to withstand the repeated mating cycles incident to the periodic reprogramming of the installation.

BRIEF DESCRIPTION OF THE DRAWINGS

The novel features which are characteristic of the invention are set forth in the appended claims. The invention itself, however, together with further aspects and attendant advantages thereof, will be best understood by references to the following description taken in connection with the accompanying drawings in which:

FIG. 1 is a schematic representation illustrating the use of the interconnection system of the present invention with a conventional multiphone telephone installation;

FIG. 2 is a perspective view of a preferred embodiment of the present invention showing its modular construction;

FIG. 3 is a plan view of the modular cross-connect system shown in FIG. 2;

FIG. 4 is a cross-sectional view taken along line 4—4 of FIG. 3;

FIG. 5 is a cross-sectional view taken along line 5—5 of FIG. 4;

FIG. 6 is a plan view of the modular cross-connect system shown in FIG. 2, but with some modification to provide additional functions;

FIG. 7 is an enlarged plan view showing in greater detail the interconnection of the relocatable connectors and connector members;

FIG. 8 is a cross-sectional view taken along line 8—8 of FIG. 7 illustrating details of the construction of a connector member suitable for use in the present invention; and FIG. 9 is a schematic representation showing the spatial arrangement of the cross-connect system of the present invention to a physically proximate switching device, the cross-connect system being shown in plan wiew and illustrating another preferred modular embodiment together with an integral cable assembly.

DETAILED DESCRIPTION OF THE INVENTION

In FIG. 1 the interconnection system of the present invention, designated generally as 10, is shown as it might be used in a multi-telephone installation. The invention will be described in the context of such a telephone installation, but those skilled in the art will recognize that the invention may be used in data processing or other multi-channel communication networks as well. The telephone installation shown in FIG. 1 includes telephone trunk lines 12, transmission or "station" cables 14 and a plurality of telephone handsets 16 each positioned within a specific location or station 18. The telephone installation also includes a switching means 20, such as a private automatic branch exchange (PABX), which provides an interface between the telephone trunk lines and the interconnection system. The switching means, however, is not essential, and the trunk lines 12 may be coupled directly to the interconnection system 10 as described in detail below.

Referring now to FIGS. 2-4, the interconnection or cross-connect system 10 is shown to include a plurality of multi-circuit connectors 22 and connector members 24, and means for interconnecting them. The interconnecting means comprises a plurality of conductor means, such as insulated conductors 26, and relocatable connectors 28.

The multi-circuit connectors 22 are preferably ribbon type contact connectors, although other suitable connector designs will be apparent to those skilled in the art. The connectors 22 are adapted to receive and couple with the telephone trunk lines directly or, as illustrated in FIGS. 1-4, with the connectorized cable 30 carrying the output circuits of the switching means 20. Connectors 22 may be mounted to a panel or sub-module 31 which is assembled in the factory prior to installation in the field. As mentioned below, however, in the use of an alternative embodiment, sub-module 31 may be eliminated.

The connector members 24 are also assembled in sub-modules 32 which may take the form shown in FIGS. 7 and 8. They are identified on the sub-module 32 by some indicia (i.e., the illustrated numerals 01, 02, etc.) representing the various stations within the telephone service area, and each includes a mating portion 34 and a terminal portion 37 adapted to terminate the respective station cables 14. Mating portion 34 preferably includes a receptacle means having one or more apertures 36 housing an active contact element 38 and configured to mate directly with any of the relocatable connectors 28. Terminal portion 37 includes a field terminable contact element, such as the illustrated insulation-piercing contact element 40, which extends into recess 42 of sub-module 32. Of course, the sub-modules 32 are assembled and mounted onto a termination module 11, as shown most clearly in FIG. 2, and the number of sub-modules employed will be dependent upon the number of stations within the telephone installation and the anticipated expansion of the installation, if any.

The interconnecting means which provides the connectorized junction between the telephone trunk lines and the connector members is an important aspect of the present invention. The conductors 26 are hard-wired or otherwise permanently affixed to the multi-circuit connectors 22 and, at their distal or free ends, to the relocatable connectors 28. Of course, each of the conductors has a length sufficient to reach the connector member positioned at the most remote or farthest point from sub-module 31. Since the interconnecting means may be assembled and prewired to the multi-circuit connectors at the factory, more reliable manufacturing techniques can be employed to provide a more rugged and durable assembly. In addition, space savings can be effected since factory assembly procedures can be more readily adapted to miniaturized circuitry and terminations. As shown most clearly in FIGS. 7 and 8, the relocatable connectors 28 mate directly with the mating portions 34 of the connector members 24, and each bears indicia representing the multi-circuit connector with which it is coupled and the individual line therein. In this manner, the relocatable connectors are identifiable with individual communication channels.

As an alternative embodiment and one discussed in greater detail below, the conductors 26 and relocatable connectors 28 may be manufactured as an integral cable assembly which may include the multi-circuit connectors 22, as well. The multi-circuit connector would then mate with a switching device or the cable assembly may couple directly to the incoming trunk lines 12, thereby eliminating the need for sub-module 31.

Means are also provided to route the various cables and conductors used in the cross-connect system 10. For example, the station cables 14 are routed through a central channel 44 and are dressed through apertures 46 in the sidewalls of the channel. Similarly, the interconnecting conductors 26 are dressed through a comb-like element 48 at the edge of sub-module 31 and into an upper channel 50 mounted above channel 44. Again, the conductors 26 are dressed through apertures 52 in the sidewalls of channel 50. By selecting the appropriate apertures 46 and 52, the wiring of the entire cross-connect system is ordered and more easily serviced. FIG. 5 illustrates the use of comb element 48 which is used in the conventional and well-known manner to take up any unwanted slack in the conductors 26.

As is evident from the drawings, the sub-modules 31 and 32 and the routing channels 44 and 50 may all be pre-assembled to main termination module 11 and can be mounted as an integral assembly in the field. Once mounted, the installation is completed simply by first coupling the trunk lines 12 to the multi-circuit connectors 22, terminating the individual station cables 14 to the terminal portions 36 of the connector members and then mating the relocatable connectors 28 and connector members 24 ad required.

A modified form of the modularized cross-connect system of the present invention is illustrated in FIG. 6 and designated generally as 10'. Module 10' includes multi-circuit connectors 22 and connector members 24, and interconnecting means as described above. In addition, means are provided to couple the circuitry of module 10' with that of another module 13, thereby enabling the interconnection of trunk lines 12 to any of the connector members 24 on module 13. As a result, the number of stations serviced by the cross-connect system of the present invention is unlimited. Specifically, module 10' includes at least one transfer sub-module 60 having transfer connectors 61 identical in configuration with the mating portion of connector members 24. These transfer connectors are wired by conductors 63 to an inter-module connector 62 which is preferably a ribbon type contact connector like those used for multi-circuit connector 22. Using a suitably connectorized cable assembly 64, the intermodule connector 62 and, in turn, the transfer connectors 61 are coupled to the connectors 22 of module 13. Thus, by mating the relocatable connector member 28' with one of the transfer connectors 61, trunk line 12 of module 10' may be coupled with any of the stations associated with module 13. This unique assemblage of components permits simple and expeditions modification of the cross-connect system to accommodate an expanded service area for the communication network.

Module 10' also includes a multiplier module 70 having a plurality of multiplying connectors 72. The multiplying connectors accept one or more relocatable connectors and are coupled to the connector members 24 of one or more stations by means of patchcords or the like. Accordingly, one or more channels may be associated with a plurality of stations.

As noted above, the present invention also contemplates an embodiment wherein the need for sub-module 31 is eliminated. This embodiment is illustrated in FIG. 9 and includes a main termination module 80 on which the sub-modules 32 and, in turn, connector members 24 are mounted. The module 80 is itself mounted within the telephone network at a location physically proximate to the terminus of the telephone trunk lines, and FIG. 9 is intended to show this spatial relationship with module 80 located adjacent the switching device 20. Typically, these components will be found within a single room or common area in the building being serviced by the telephone installation.

Since the module 80 and switching device 20 are spaced by a relatively small distance in a given installation, an integral cable assembly 82 may be fabricated at the factory having a predetermined length sufficient to extend between them. The cable assembly 82 houses a plurality of conductor means which extend as individual conductors 26 from one end of the assembly, the conductors 26 being terminated by relocatable connectors 28. The other end of the conductor means are coupleable to the terminus of the trunk lines 12 as shown, for example, in FIG. 9 where a multi-circuit connector 84 is employed to mate with compatible connectors 21 on the switching device 20.

The module 80 and one or more cable assemblies 82 may be packaged in kit form and shipped to the installation site where the module is mounted and the cable assembly 82 dressed from the switching device to the module. The cable assembly may extend, as shown, to the mid-area of the module from which point the individual conductors 26 are routed to permit coupling of the appropriate relocatable connectors 28 and connector members 24. Those skilled in the art will recognize, of course, that other trunk line terminus structure might be utilized, such as a conventional telephony connector block, in which case the cable assembly would be affixed and electrically coupled directly to the connector block.

The module 80 is designed to accommodate routing channels 50 and 44, or functionally equivalent structure, on adjacent sides of the sub-modules 32, and also includes fastening means 86 for to physically secure cable assembly 82 and transmission cables 14. It is also contemplated that the module 80 may be enclosed in a housing 88 or mounted to a supporting surface, alone, without a housing.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. An interconnection system for manually programming the assignment of individual communication channel identifiers of a multi-channel communication network to individual stations at different locations within the network service area, said system comprising:

a plurality of multi-circuit connectors adapted to receive and couple with communication trunk lines;

a plurality of connector members each including indicia identifiable with a given station within said network service area and having a mating portion and a terminal portion adapted to field terminate an information transmission cable associated with said given station; and means for interconnecting said multi-circuit connectors and said connector members including a plurality of conductor means, each electrically coupled to and permanently affixed at one end to said multi-circuit connector and electrically coupled to and permanently affixed at its other end to a relocatable connector, each said relocatable connector including indicia identifiable with one of said communication channels and directly matable with the mating portion of any of said connector members, whereby the individual communication channels may be manually assigned to the individual communication stations.

2. The interconnection system of claim 1 wherein said multi-circuit connectors, said connector members and said interconnecting means are housed on a termination module mountable onto a supporting surface.

3. The interconnection system of claim 2 wherein said multi-circuit connectors and said interconnecting means are prewired and said multi-circuit connector and said connector members are preassembled to said termination module to permit interconnection of said communication system by terminating said communication trunk lines and said transmission cables to said multi-circuit connectors and said connector members, respectively, and thereafter mating said relocatable connectors to selected ones of said connector members.

4. The interconnection system of claim 2 wherein said multi-circuit connectors are assembled on at least one sub-module and said connector members are assembled on at least one sub-module, said sub-modules being mountable on said termination module.

5. The interconnection system of claim 1 wherein the terminal portions of said connector members comprise field terminable, insulation-piercing termination elements.

6. The interconnection system of claim 1 wherein said conductor means comprise insulated conductors of a length sufficient to reach the connector member most remote from said multi-circuit connectors.

7. The interconnection system of claim 1 wherein said conductor means and said relocatable connectors of said interconnecting means are assembled into an integral structure of rugged construction capable of repeated mating cycles with said connector members.

8. The interconnection system of claim 1 further including a second plurality of connector members associated with additional communication stations, and means permitting the coupling of preselected ones of said multi-circuit connectors with any of said second plurality of connector members.

9. The interconnection system of claim 1 further including a plurality of multiplier connector members each having a mating portion and a termimal portion adapted to couple with a plurality of information transmission cables associated with different communication stations, whereby mating one of said relocatable connectors to the mating portion of said multiplier connector member associates one of said channel identifiers with each of said different communication stations.

10. The interconnection system of claim 1 wherein said communication network is a multi-phone telephone network including an automatic switching apparatus, said switching apparatus interfacing with telephone trunk lines and having at least one connectorized cable assembly matable with said multi-circuit connectors.

11. A low cost, space-saving and manually reprogrammable telephone system for providing telephone service to a multi-phone service area comprising:

a plurality of multi-circuit connectors adapted to couple with telephone trunk lines;

a plurality of multi-conductor station cables each individually associated with a given station within said service area;

a plurality of receptacle means mounted on at least one sub-module, each receptacle means including indicia identifiable with a given station and having a mating portion and a terminal portion adapted to field terminate one of said station cables by insulation-piercing termination; and means for interconnecting said multi-circuit connectors and said receptacle means comprising a plurality of connectorized conductor means, each conductor means being electrically coupled to and permanently affixed at one end to one of said multi-circuit connectors and at its other end to a connector plug means, each said connector plug means including indicia identifiable with a telephone number of said telephone trunk lines and directly matable within any of said receptacle means, whereby the individual telephone numbers may be manually assigned to the individual stations.

12. The reprogrammable telephone system of claim 11 wherein said multi-circuit connectors and said interconnecting means are prewired and said sub-modules are preassembled onto a termination module to permit initial programming of said telephone system by terminating said telephone trunk lines and said station cables to said multi-circuit connectors and said receptacle means, respectively, and thereafter mating said plug means to selected ones of said receptacle means.

13. The interconnection system of claim 1 wherein said multi-circuit connectors and said interconnecting means are preassembled as one or more integral cable assemblies.

14. An interconnection system for manually programming the assignment of individual communication channels of a multi-channel communication network to individual stations at different locations within the network service area, said system comprising:

at least one multi-circuit connector adapted to couple with communication trunk lines;

a plurality of connector members each including indicia identifiable with a given station within said network service area and having a mating portion and a terminal portion adapted to field terminate an information transmission cable associated with said given station; and means for interconnecting said multi-circuit connectors and said connector members including a plurality of conductor means, each electrically coupled to and permanently affixed at one end to said multi-circuit connector and electrically coupled at its other end to a relocatable connector, each said relocatable connector including indicia identifiable with one of said communication channels and directly matable with the mating portion of any of said connector members, whereby the individual communication channels may be manually assigned to the individual stations within the network.

15. The interconnection system of claim 14 wherein said connector members are disposed on a termination module mountable onto a supporting surface.

16. The interconnection system of claim 15 wherein said multi-circuit connector and said interconnecting means are prewired as an integral assembly and said connector members are preassembled to said termination module to permit interconnection of said communication system by coupling said trunk lines with said multi-circuit connector and by terminating said transmission cables to said connector members, and thereafter mating said relocatable connectors to selected ones of said connector members.

17. The interconnection system of claim 16 wherein said conductor means and said relocatable connectors of said interconnecting means are assembled into an integral structure of rugged construction capable of repeated mating cycles with said connector members.

18. An interconnection system for manually programming the assignment of individual communication channels of a multi-channel communication network to individual stations at different locations within the network service area, said system comprising:
 a plurality of connector members each including indicia identifiable with a given station within said network service area and having a mating portion and a terminal portion adapted to field terminate an information transmission cable associated with said given station by insulation-piercing termination; and
 means for interconnecting said connector members with communication trunk lines of said communication network including at least one integral cable assembly of predetermined length having a plurality of conductor means terminating at one end to a plurality of relocatable connectors and coupleable at the other end to said trunk lines, each said relocatable connector including indicia identifiable with one of said communication channels and directly matable with the mating portion of any of said connector members, whereby the individual communication channels may be manually assigned to the individual stations.

19. A kit for assembly of an interconnection apparatus used to manually program the assignment of individual communication channels of a multi-channel communication network to individual stations at different locations within the network service area, said communication network including communication trunk lines having a terminus within said network physically proximate to the interconnection apparatus, said kit comprising:
 a plurality of connector members disposed on a termination module adapted for mounting at an interconnection location within said network, each connector member including indicia identifiable with a given station within said network service area and having a mating portion and a terminal portion adapted to field terminate an information transmission cable associated with said given station; and
 at least one integral cable assembly of a predetermined length sufficient to extend from said termination location at which the termination module is mounted to the physically proximate terminus of said communication trunk lines, said cable assembly having a plurality of conductor means terminating in a plurality of relocatable connectors at one end and coupleable at the other end to said terminus of said trunk lines, each said relocatable connector including indicia identifiable with one of said communication channels and directly mateable with the mating portion of any of said connectors members;
 whereby said termination module may be mounted within said network with said information cables terminated to the terminal portions of said connector members, and said cable assembly may be dressed from said communication trunk line terminus to said termination module with said relocatable connectors mated to the mating portions of said connector members, to thereby assemble said interconnection apparatus and assign the individual channels to individual stations within said communication network.

20. The kit as set forth in claim 19 wherein said conductor means each extends individually from said cable assembly a sufficient length to permit the mating of its respective relocatable connector with any of said connector members.

21. The kit as set forth in claim 19 wherein said communication trunk line terminus comprises a switching device and said cable assembly includes at the end opposite said relocatable connectors at least one multi-circuit connector for electrically coupling to said switching device.

22. The kit as set forth in claim 19 further including a housing for mounting of said termination module, said housing including a plurality of apertures to accommodate said cable assembly and said information transmission cables.

* * * * *